US011889486B2

(12) United States Patent
Gao et al.

(10) Patent No.: US 11,889,486 B2
(45) Date of Patent: Jan. 30, 2024

(54) DATA TRANSMISSION CONTROL METHOD, APPARATUS, AND ACCESS NETWORK DEVICE

(71) Applicant: HUAWEI TECHNOLOGIES CO., LTD., Shenzhen (CN)

(72) Inventors: Quanzhong Gao, Shanghai (CN); Heng Xu, Shanghai (CN); Mingtao Xu, Shanghai (CN); Kunchao Bao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 17/147,002

(22) Filed: Jan. 12, 2021

(65) Prior Publication Data

US 2021/0136765 A1 May 6, 2021

Related U.S. Application Data

(63) Continuation of application No. PCT/CN2019/095999, filed on Jul. 15, 2019.

(30) Foreign Application Priority Data

Jul. 13, 2018 (CN) .......................... 201810771020.7

(51) Int. Cl.
*H04W 72/0453* (2023.01)
*H04L 25/02* (2006.01)
*H04W 88/08* (2009.01)

(52) U.S. Cl.
CPC ..... *H04W 72/0453* (2013.01); *H04L 25/0204* (2013.01); *H04W 88/08* (2013.01)

(58) Field of Classification Search
CPC ............. H04W 72/21; H04W 72/1268; H04W 72/0453; H04W 88/085; H04W 88/08;
(Continued)

(56) References Cited

U.S. PATENT DOCUMENTS 5,933,423 A * 8/1999 Laakso ................ H04B 1/7107
370/335
2011/0051685 A1 * 3/2011 Saitou ................... H04W 36/02
370/331
(Continued)

FOREIGN PATENT DOCUMENTS

CN 101365188 A 2/2009
CN 101557375 A 10/2009
(Continued)

OTHER PUBLICATIONS

English translation of CN 102098071 provided in the IDS, Wu, Wangjun. (Year: 2011).*
(Continued)

*Primary Examiner* — Ricardo H Castaneyra
(74) *Attorney, Agent, or Firm* — HAUPTMAN HAM, LLP

(57) ABSTRACT

Embodiments of this application relate to the communications field, and provide a data transmission control method. The method includes: obtaining, by the first communications apparatus, radio frequency signals; processing, by the first communications apparatus, at least two parts of signals in the radio frequency signals in at least two functional split manners, to generate at least two parts of transmission signals, where each part of signals in the radio frequency signals is processed in one functional split manner, and different parts of signals in the radio frequency signals are processed in different functional split manners; and sending,
(Continued)

by the first communications apparatus, the at least two parts of transmission signals to the second communications apparatus.

19 Claims, 7 Drawing Sheets

(58) Field of Classification Search
CPC ............... H04W 24/02; H04L 25/0204; H04L 25/03006
See application file for complete search history.

(56) References Cited

U.S. PATENT DOCUMENTS

| | | |
|---|---|---|
| 2013/0017852 A1 | 1/2013 | Liu et al. |
| 2013/0083768 A1 | 4/2013 | Liu et al. |

FOREIGN PATENT DOCUMENTS

| | | |
|---|---|---|
| CN | 102098071 A | 6/2011 |
| CN | 103546402 A | 1/2014 |
| CN | 104066196 A | 9/2014 |
| CN | 107872461 A | 4/2018 |
| CN | 107872876 A | 4/2018 |
| CN | 107995656 A | 5/2018 |
| EP | 3269118 A2 | 1/2018 |
| EP | 3500060 A1 | 6/2019 |
| EP | 3500061 A1 | 6/2019 |
| IN | 107027153 A | 8/2017 |
| JP | 2014090346 A | 5/2014 |
| WO | 2018029853 A1 | 2/2018 |
| WO | 2018029854 A1 | 2/2018 |

OTHER PUBLICATIONS

Intel Corporation: "Fronthaul and RAN functional split aspects of the next generation radio access network", 3GPP Draft; R3-160622, Apr. 2, 2016, XP051082993, total 6 pages.

Extended European Search Report issued in corresponding European Application No. 19835027.4, dated Jul. 28, 2021, pp. 1-14, European Patent Office, Munich, Germany.

Japanese Office Action issued in corresponding Japanese Application No. 2021-524094, dated Mar. 14, 2022, pp. 1-13.

Zhaowenyu et al., "5G proposes many transformations for bearer networks, and multiple solutions compete for each other", Communications World, 2017, with an English machine translation, total 7 pages.

NTT Docomo, Inc et al., "NR L1 processing diagram", 3GPP TSG RAN WG3 Meeting NR AH#2 R3-172580, Qingdao, China, Jun. 27-29, 2017, total 3 pages.

ZTE Corporation, "Further analysis on option 7", 3GPP TSG RAN WG3 NR#97 R3-172946, Berlin, Germany, Aug. 21 25, 2017, total 6 pages.

Chinese Office Action issued in corresponding Chinese Application No. 201810771020.7, dated May 19, 2020, pp. 1-12.

Chinese Office Action issued in corresponding Chinese Application No. 201810771020.7, dated Jan. 5, 2021, pp. 1-5.

International Search Report issued in corresponding International Application No. PCT/CN2019/095999, dated Oct. 14, 2019, p. 1-10.

\* cited by examiner

DATA TRANSMISSION CONTROL METHOD, APPARATUS, AND ACCESS NETWORK DEVICE

CROSS-REFERENCE TO RELATED APPLICATIONS

This application is a continuation of International Application No. PCT/CN2019/095999, filed on Jul. 15, 2019, which claims priority to Chinese Patent Application No. 201810771020.7, filed on Jul. 13, 2018, The disclosures of the aforementioned applications are hereby incorporated by reference in their entireties.

TECHNICAL FIELD

Embodiments of this application relate to the communications field, and in particular, to a data transmission method, an apparatus, and an access network device.

BACKGROUND

In a C-RAN (centralized processing, collaborative radio, real-time cloud infrastructure, clean system-radio access network) architecture, a BBU (baseband unit) that has a baseband processing function is deployed in a centralized manner, and an RRU (radio remote unit) that has a remote radio frequency processing function is remotely deployed. This architecture has advantages such as fast network deployment, space saving, easy operation and management, easy inter-site coordination, and easy carrier expansion, and therefore, network performance is significantly improved. In conventional functional split on the BBU and the RRU, a CPRI (common public radio interface) is used to transmit, to the BBU, time domain data received by the RRU from each antenna. When high bandwidth and a large-scale array antenna are used, bandwidth of the CPRI between the BBU and the RRU limits C-RAN large scale deployment. Functional re-split of the BBU and the RRU is a solution to meet a high CPRI transmission bandwidth requirement in new technologies such as network high bandwidth and massive MIMO. Second, to meet a low-latency and high-bandwidth upper-layer service requirement, a service tends to be deployed at a lower layer and a core network function tends to be deployed at a network edge. In this case, a high-bandwidth and low-latency CPRI is a basis for meeting the upper-layer service requirement.

In a 4.5G/5G wireless network main device, a position of an interface between a baseband processing function and a remote radio frequency processing function may re-determine functions of a BBU and an RRU, to implement functional split on the BBU and the RRU. How to use different functional split manners to perform data transmission becomes an urgent problem to be resolved.

SUMMARY

Embodiments of this application provide a data transmission method, an apparatus, and an access network device, so that data transmission can be implemented between a first communications apparatus and a second communications apparatus in a plurality of functional split manners.

To achieve the foregoing objectives, the following technical solutions are used in the embodiments of this application.

According to a first aspect, a data transmission control method is provided. The data transmission control method is applied to a first communications apparatus or a chip in a first communications apparatus. The first communications apparatus is a radio remote unit RRU, a radio remote system RRS, or a distributed unit DU. Specifically, the data transmission control method according to an embodiment of this application includes: The first communications apparatus obtains radio frequency signals received through an antenna; the first communications apparatus processes at least two parts of signals in the radio frequency signals in at least two functional split manners, to generate at least two parts of transmission signals, where each part of signals in the radio frequency signals is processed in one functional split manner, and different parts of signals in the radio frequency signals are processed in different functional split manners; and the functional split manner is used to determine functional split on the first communications apparatus and the second communications apparatus when the part of signals in the radio frequency signals is processed; and the first communications apparatus sends the at least two parts of transmission signals to the second communications apparatus. In this way, according to a first functional split manner, for example, an option. 7-2a split manner, the first communications apparatus directly processes a first part of signals in the radio frequency signals and then sends the first part of signals to the second communications apparatus, and the second communications apparatus performs, on the first part of signals, processing of a channel estimation module and another function module after the channel estimation module; according to a second functional split manner, for example, an option. 7-new split manner, the first communications apparatus still needs to perform, on a second part of signals in the radio frequency signals, processing of a channel estimation module and an equalization module, and then send the second part of signals to the second communications apparatus, and the second communications apparatus performs processing of a frequency-to-time conversion module and another function module after the frequency-to-time conversion module. In this way, data transmission is implemented between the first communications apparatus and the second communications apparatus in a plurality of functional split manners.

Optionally, the data transmission control method further includes: The first communications apparatus divides the radio frequency signals into the at least two parts of signals. It should be noted that the first communications apparatus may directly divide the radio frequency signals into the at least two parts of signals; or the first communications apparatus performs first processing on the radio frequency signals, and then divides the radio frequency signals obtained after the first processing into the at least two parts of signals, where the first processing includes at least analog-to-digital conversion processing. In this application, the first processing may include analog-to-digital conversion processing; or the first processing may include analog-to-digital conversion processing and time-to-frequency conversion processing; or the first processing may include analog-to-digital conversion processing, time-to-frequency conversion processing, beamforming processing, and the like. Certainly, based on different functional split manners, the first processing may alternatively include more functions of an uplink direction (namely, a transmission direction of data from the first communications apparatus to the second communications apparatus).

Optionally, that the first communications apparatus divides the radio frequency signals into the at least two parts of signals may be specifically implemented with reference to the following manners.

Manner 1: That the first communications apparatus divides the radio frequency signals into the at least two parts of signals includes: The first communications apparatus divides the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus.

Manner 2: The radio frequency signals are carried on at least two resource blocks RBs, and that the first communications apparatus divides the radio frequency signals into the at least two parts of signals includes: The first communications apparatus obtains a quantity of user data streams carried on each RB; the first communications apparatus classifies a radio frequency signal carried on at least one RB with a quantity of user data streams greater than or equal to a stream quantity threshold as a first part of signals; and the first communications apparatus classifies a radio frequency signal carried on at least one RB with a quantity of user data streams less than the stream quantity threshold as a second part of signals. The first part of signals is processed in the first functional split manner, and the first functional split manner includes the option. 7-2a split manner. The second part of signals is processed in the second functional split manner, and the second functional split manner includes the option. 7-new split manner.

Manner 3: That the first communications apparatus divides the radio frequency signals into the at least two parts of signals includes: The first communications apparatus divides the radio frequency signals obtained after predetermined processing into the at least two parts of signals based on any one or more of the following: an air interface feature of a user data stream carried on a resource block RB in a first signal, an evolved protocol version used for the user data stream, or a type of a receiver used for the user data stream.

Manner 4: The radio frequency signals are carried on at least two channels, and that the first communications apparatus divides the radio frequency signals into the at least two parts of signals includes: The first communications apparatus classifies a radio frequency signal carried on a first channel as a first part of signals; and the first communications apparatus classifies a radio frequency signal carried on a second channel as a second part of signals.

Manner 5: The radio frequency signals include signals of M users and signals of N users, and that the first communications apparatus divides the radio frequency signals into the at least two parts of signals includes: The first communications apparatus classifies the signals of the M users in the radio frequency signals as a first part of signals; and the first communications apparatus classifies the signals of the N users in the radio frequency signals as a second part of signals.

Manner 6: The radio frequency signals include a signal in first bandwidth of a first user and a signal in second bandwidth of the first user; and that the first communications apparatus divides the radio frequency signals into the at least two parts of signals includes: The first communications apparatus classifies the signal, in the radio frequency signals, in the first bandwidth of the first user as a first part of signals; and the first communications apparatus classifies the signal, in the radio frequency signals, in the second bandwidth of the first user as a second part of signals.

Optionally, the at least two functional split manners include an option. 7-2a split manner and an option. 7-new split manner.

According to a second aspect, a first communications apparatus is provided. The first communications apparatus is an RRU, an RRS, or a DU; or the first communications apparatus is a chip in an RRU, an RRS, or a DU. Specifically, the first communications apparatus includes an obtaining unit, a processing unit, and a sending unit. Functions implemented by units and modules provided in this application are specifically as follows. The obtaining unit is configured to obtain radio frequency signals received through an antenna. The processing unit is configured to process, in at least two functional split manners, at least two parts of signals in the radio frequency signals obtained by the obtaining unit, to generate at least two parts of transmission signals, where each part of signals in the radio frequency signals is processed in one functional split manner, and different parts of signals in the radio frequency signals are processed in different functional split manners; and the functional split manner is used to determine functional split on the first communications apparatus and a second communications apparatus when the part of signals in the radio frequency signals is processed. The sending unit is configured to send, to the second communications apparatus, the at least two parts of transmission signals generated by the processing unit.

Optionally, the processing unit is further configured to divide the radio frequency signals obtained by the obtaining unit into the at least two parts of signals.

Optionally, the processing unit is further configured to perform first processing on the radio frequency signals obtained by the obtaining unit; and the processing unit is specifically configured to divide the radio frequency signals obtained after the first processing into the at least two parts of signals, where the first processing includes at least analog-to-digital conversion processing.

Optionally, the processing unit is specifically configured to divide the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus.

Optionally, the radio frequency signals are carried on at least two resource blocks RBs, and the processing unit is specifically configured to: obtain a quantity of user data streams carried on each RB; classify a radio frequency signal carried on at least one RB with a quantity of user data streams greater than or equal to a stream quantity threshold as a first part of signals; and classify a radio frequency signal carried on at least one RB with a quantity of user data streams less than the stream quantity threshold as a second part of signals.

Optionally, the first part of signals is processed in a first functional split manner, and the first functional split manner includes an option. 7-2a split manner; and the second part of signals is processed in a second functional split manner, and the second functional split manner includes an option. 7-new split manner.

Optionally, the processing unit is specifically configured to divide the radio frequency signals obtained after predetermined processing into the at least two parts of signals based on any one or more of the following: an air interface feature of a user data stream carried on a resource block RB in a first signal, an evolved protocol version used for the user data stream, or a type of a receiver used for the user data stream.

Optionally, the radio frequency signals are carried on at least two channels, and the processing unit is specifically configured to: classify a radio frequency signal carried on a first channel as a first part of signals; and classify a radio frequency signal carried on a second channel as a second part of signals.

Optionally, the radio frequency signals include signals of M users and signals of N users, and the processing unit is specifically configured to: classify the signals of the M users in the radio frequency signals as a first part of signals; and classify the signals of the N users in the radio frequency signals as a second part of signals.

Optionally, the radio frequency signals include a signal in first bandwidth of a first user and a signal in second bandwidth of the first user, and the processing unit is specifically configured to: classify the signal, in the radio frequency signals, in the first bandwidth of the first user as a first part of signals; and classify the signal, in the radio frequency signals, in the second bandwidth of the first user as a second part of signals.

Optionally, the at least two functional split manners include an option. 7-2a split manner and an option. 7-new split manner.

Optionally, the first communications apparatus includes one or more processors and at least one communications interface. The at least one communications interface is coupled to the one or more processors. The first communications apparatus communicates with another device through the at least one communications interface. The processor is configured to execute computer program code in a memory, and the computer program code includes an instruction, so that the first communications apparatus performs the data transmission control method according to the first aspect and the possible implementations of the first aspect. The at least one communications interface includes a first interface between the first communications apparatus and the second communications apparatus, and the first interface is configured to transmit the at least two parts of transmission signals. In addition, the at least one communications interface further includes a second interface between the first communications apparatus and an antenna system, and the second interface is configured to transmit the radio frequency signals.

According to a third aspect, a computer-readable storage medium is further provided. The computer-readable storage medium stores an instruction; and when the instruction is run on a first communications apparatus, the first communications apparatus is enabled to perform the data transmission control method according to the first aspect and the possible implementations of the first aspect.

According to a fourth aspect, a computer program product including an instruction is further provided. When the computer program product runs on a first communications apparatus, the first communications apparatus is enabled to perform the data transmission control method according to the first aspect and the possible implementations of the first aspect.

In this application, a name of the first communications apparatus does not constitute any limitation to devices or function modules. During actual implementation, these devices or function modules may have other names Provided that functions of the devices or the function modules are similar to those in this application, the devices or the function modules fall within the scope of the claims in this application and their equivalent technologies.

In this application, for detailed descriptions of the second aspect, the third aspect, the fourth aspect, and various implementations of the second aspect, the third aspect, and the fourth aspect, refer to the detailed descriptions of the first aspect and the implementations of the first aspect. In addition, for beneficial effects of the second aspect, the third aspect, the fourth aspect, and the various implementations of the second aspect, the third aspect, and the fourth aspect, refer to analysis of the beneficial effects of the first aspect and the implementations of the first aspect. Details are not described herein again.

According to a fifth aspect, a data transmission control method is provided. The data transmission control method is applied to a second communications apparatus or a chip in a second communications apparatus. The second communications apparatus is a baseband unit BBU, a radio cloud center RCC, or a central unit CU. Specifically, the data transmission control method according to an embodiment of this application includes: The second communications apparatus receives at least two parts of transmission signals sent by a first communications apparatus, where the at least two parts of transmission signals are generated after the first communications apparatus processes, in at least two functional split manners, at least two parts of signals in radio frequency signals received through an antenna; each part of signals in the radio frequency signals is processed in one functional split manner, and different parts of signals in the radio frequency signals are processed in different functional split manners; and the functional split manner is used to determine functional split on the first communications apparatus and the second communications apparatus when the part of signals in the radio frequency signals is processed; and the second communications apparatus separately processes the at least two parts of transmission signals in the at least two functional split manners, where each part of transmission signals is processed in one functional split manner, and different parts of transmission signals are processed in different functional split manners. For beneficial effects of the data transmission control method according to the second aspect, refer to analysis of the beneficial effects of first aspect. Details are not described herein again.

Optionally, the at least two functional split manners include an option. 7-2a split manner and an option. 7-new split manner.

According to a sixth aspect, a second communications apparatus is provided. The second communications apparatus is a BBU, an RCC, or a CU; or the second communications apparatus is a chip in a BBU, an RCC, or a CU. Specifically, the second communications apparatus includes a receiving unit and a processing unit. Functions implemented by units and modules provided in this application are specifically as follows. The receiving unit is configured to receive at least two parts of transmission signals sent by a first communications apparatus, where the at least two parts of transmission signals are generated after the first communications apparatus processes, in at least two functional split manners, at least two parts of signals in radio frequency signals received through an antenna; each part of signals in the radio frequency signals is processed in one functional split manner, and different parts of signals in the radio frequency signals are processed in different functional split manners; and the functional split manner is used to determine functional split on the first communications apparatus and the second communications apparatus when the part of signals in the radio frequency signals is processed. The processing unit is configured to separately process, in the at least two functional split manners, the at least two parts of transmission signals received by the receiving unit, where each part of transmission signals is processed in one functional split manner, and different parts of transmission signals are processed in different functional split manners.

Optionally, the at least two functional split manners include an option. 7-2a split manner and an option. 7-new split manner.

Optionally, the second communications apparatus includes one or more processors and at least one communications interface. The at least one communications interface is coupled to the one or more processors. The second communications apparatus communicates with another device through the at least one communications interface. The processor is configured to execute computer program code in a memory, and the computer program code includes an instruction, so that the second communications apparatus performs the data transmission control method according to the fifth aspect and the possible implementations of the sixth aspect. The at least one communications interface is configured to transmit the at least two parts of transmission signals.

According to a seventh aspect, a computer-readable storage medium is further provided. The computer-readable storage medium stores an instruction; and when the instruction is run on a second communications apparatus, the second communications apparatus is enabled to perform the data transmission control method according to the fifth aspect and the possible implementations of the fifth aspect.

According to an eighth aspect, a computer program product including an instruction is further provided. When the computer program product runs on a second communications apparatus, the second communications apparatus is enabled to perform the data transmission control method according to the fifth aspect and the possible implementations of the fifth aspect.

In this application, a name of the second communications apparatus does not constitute any limitation to devices or function modules. During actual implementation, these devices or function modules may have other names Provided that functions of the devices or the function modules are similar to those in this application, the devices or the function modules fall within the scope of the claims in this application and their equivalent technologies.

In this application, for detailed descriptions of the sixth aspect, the seventh aspect, the eighth aspect, and various implementations of the sixth aspect, the seventh aspect, and the eighth aspect, refer to the detailed descriptions of the fifth aspect and the implementations of the fifth aspect. In addition, for beneficial effects of the sixth aspect, the seventh aspect, the eighth aspect, and the various implementations of the sixth aspect, the seventh aspect, and the eighth aspect, refer to analysis of the beneficial effects of the fifth aspect and the implementations of the fifth aspect.

Details are not described herein again.

According to a ninth aspect, an access network device is further provided. The access network device includes the first communications apparatus and the second communications apparatus. For example, the access network device includes a base station.

These aspects or other aspects in this application are more concise and comprehensible in the following descriptions.

BRIEF DESCRIPTION OF DRAWINGS

To describe technical solutions in embodiments of the present application or in the prior art more clearly, the following briefly describes the accompanying drawings required for describing the embodiments.

DETAILED DESCRIPTION OF EMBODIMENTS

The following clearly and completely describes technical solutions in embodiments of the present application with reference to the accompanying drawings in the embodiments of this application.

The terms used in the embodiments of this application are merely for the purpose of describing specific embodiments, and are not intended to limit this application. The terms "a", "an" and "the" of singular forms used in the embodiments of this application and the appended claims are also intended to include plural forms, unless otherwise specified in the context clearly. It should also be understood that, the term "and/or" used in this specification indicates and includes any or all possible combinations of one or more associated listed items. The character "I" in this specification generally indicates an "or" relationship between the associated objects. In addition, the terms "first", "second", and the like in this application do not indicate importance or a sequence, but merely indicate a difference.

The term "for example" in the embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner. The term "module" used in this application is intended to refer to a device or an entity that can perform digital signal or analog signal processing, or may refer to a computer-related entity. The device or the entity may be hardware, firmware, a combination of hardware and software, software, or running software.

Figure 1:
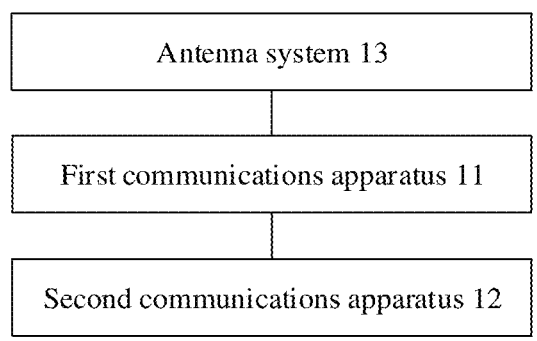
FIG. 1 is a schematic structural diagram of a base station according to an embodiment of this application.

Referring to FIG. 1, an embodiment of this application provides an access network device, for example, a base station. The base station includes a first communications apparatus 11, a second communications apparatus 12, and an antenna system 13 (antenna). The first communications apparatus 11 is connected to the second communications apparatus 12. Optionally, the first communications apparatus 11 may be connected to the second communications apparatus 12 through a CPRI interface. The first communications apparatus 11 is connected to the antenna system 13. The second communications apparatus 12 has a baseband processing function, and the first communications apparatus 11 has a remote radio frequency processing function.

The base station shown in FIG. 1 may be a distributed base station. The base station may be configured to communicate with one or more user equipments, or may be configured to communicate with one or more base stations having some user equipment functions (for example, communication between a macro base station and a micro base station, for example, an access point). The base station may alternatively be referred to as an access point, a node, a NodeB, an evolved NodeB (eNB), or another network entity, and may include some or all functions of the foregoing network entities. In systems using different radio access technologies, names of the base station may be different. For example, in an LTE network (or referred to as a 4G system), a name of the base station is an evolved NodeB (eNB or eNodeB); in a 3G system, a name of the base station is a NodeB; in a next-generation radio communications system (for example, a 5G system), a name of the base station is a DgNB. With evolution of communications technologies, a name of the base station may change. In addition, in another possible case, the base station may be another apparatus that provides a wireless communication function for a terminal device.

Optionally, the base station shown in FIG. 1 may be a 4G base station, the second communications apparatus 12 may be a BBU, and the first communications apparatus 11 may be an RRU.

Optionally, the base station shown in FIG. 1 may be a base station that appears in a process of evolution from a 4G base station to a 5G base station. The base station may have functions of the 4G base station and some functions of the 5G base station, and the base station may be referred to as a 4.5G base station.

Optionally, the base station shown in FIG. 1 may be a 5G base station.

When the base station shown in FIG. 1 is a 4.5G base station or a 5G base station, the second communications apparatus 12 may be a CU (centralized unit) responsible for centralized management and control of radio resources and connections, and the first communications apparatus 11 may be a DU (distributed unit) that implements a distributed user plane processing function.

When the base station shown in FIG. 1 is a 4.5G base station or a 5G base station, functions of the first communications apparatus 11 and the second communications apparatus 12 may be redefined. For example, some processing functions of the second communications apparatus 12 are moved to the first communications apparatus 11. After reconstruction, the second communications apparatus 12 may be referred to as an RCC (radio cloud center), and the first communications apparatus 11 may be referred to as an RRS (radio remote system).

Figure 2:
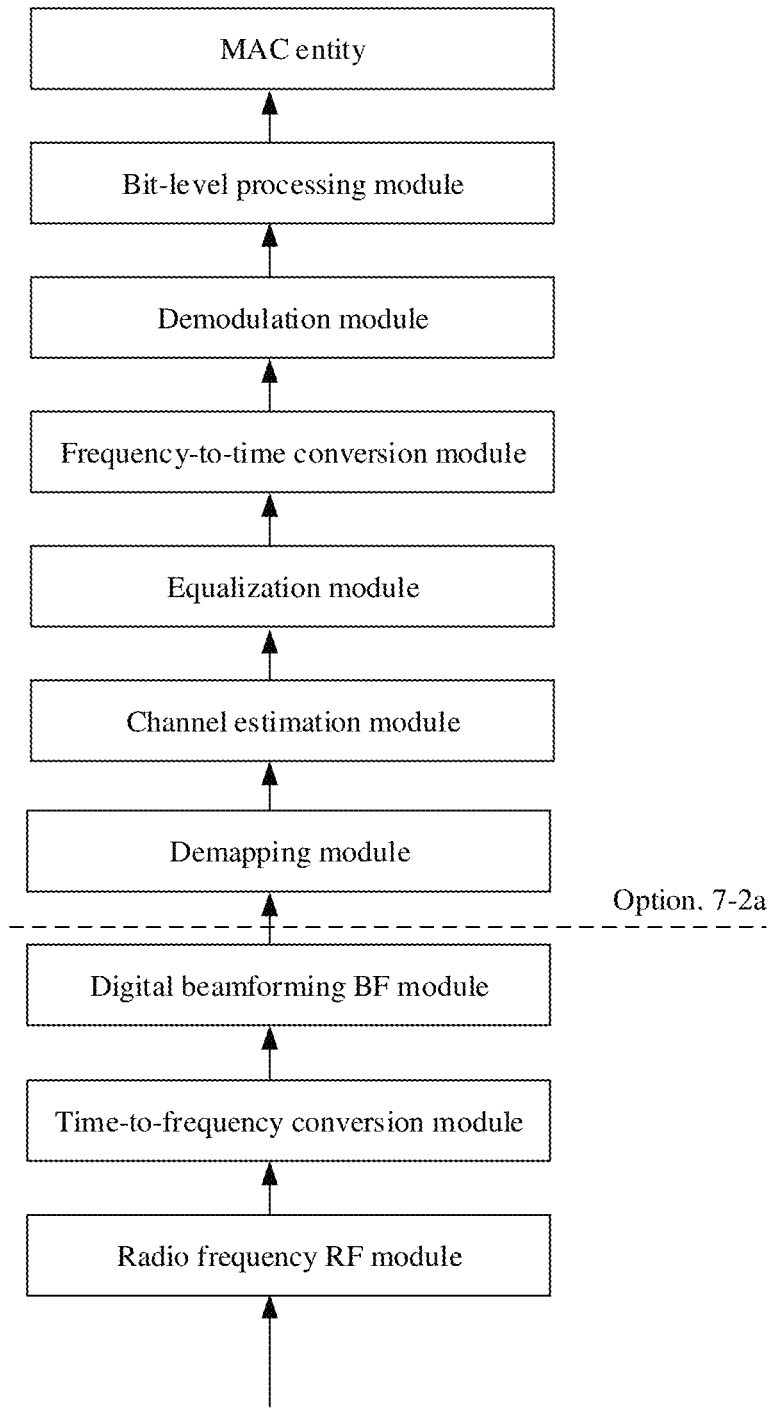
FIG. 2 is a schematic diagram of functional split on a first communications apparatus and a second communications apparatus according to an embodiment of this application.

FIG. 2 shows a functional split manner of the first communications apparatus 11 and the second communications apparatus 12. The split manner may be denoted as an option. 7-2a. Referring to FIG. 2, the following uses an uplink direction (namely, a transmission direction of data from the first communications apparatus 11 to the second communications apparatus 12) as an example for description.

The first communications apparatus 11 includes: a radio frequency RF (radio frequency) module, a time-to-frequency conversion module (which is usually a FFT (fast fourier transformation) module), and a BF (digital beamforming) module. The RF module is configured to perform analog-to-digital conversion on a radio frequency signal (an analog signal) received from an antenna, to convert the radio frequency signal into a time domain digital signal. The time-to-frequency conversion module is configured to perform time-to-frequency conversion on the time domain digital signal, to generate a frequency domain digital signal. For example, the time-to-frequency conversion is performed by using an FFT algorithm, and in a solution, before the time-to-frequency conversion is performed, cyclic prefix removal (CP removal for short) may be further performed, so that the time-to-frequency conversion module may include an FFT module configured to perform the time-to-frequency conversion and a CP removal module configured to remove a cyclic prefix. The digital BF module is configured to perform beamforming on the frequency domain digital signal, to generate a digital signal of a beam domain. FIG. 2 shows only one implementation of the first communications apparatus 11. Usually, the time-to-frequency conversion module and the digital BF module may further exchange positions, to be specific, first, the digital BF module performs beamforming on the time domain digital signal, to generate a time domain digital signal of a beam domain, and then the time-to-frequency conversion module performs time-to-frequency conversion on the time domain digital signal of the beam domain, to generate a frequency domain digital signal of the beam domain.

The second communications apparatus 12 includes a demapping (RE demapping) module, a channel estimation module, an equalization module, a frequency-to-time conversion module (which is usually an inverse discrete fourier transformation IDFT (inverse discrete fourier transform) module), a demodulation module, a bit-level processing module, and a MAC (media access control) entity. The demapping module is configured to demap the digital signal, of the beam domain, output by the first communications apparatus 11. The channel estimation module is configured to perform channel estimation on a signal output by the demapping module. The equalization module is configured to: perform equalization processing on a signal output by the channel estimation module, and combine user signals of a plurality of different beams, so that a signal obtained after the equalization processing is a frequency domain user layer signal. The frequency-to-time conversion module is configured to perform frequency-to-time conversion on the signal output by the equalization module, and a generated signal is a time domain user layer signal. The demodulation module is configured to perform constellation demapping processing on the signal output by the frequency-to-time conversion module. The bit-level processing module is configured to perform processing such as descrambling, de-rate matching (rate dematching), and decoding on a signal output by the demodulation module, to generate a bit data stream of a user, where the bit-level processing module may further implement another bit-level processing function, and certainly, the processing such as the descrambling, the rate dematching, and the decoding may be implemented in the bit-level processing module in a centralized manner or may be implemented by using an independent function module. The MAC entity is configured to submit the bit data stream output by the bit-level processing module to a higher-layer MAC entity for processing.

Figure 3:
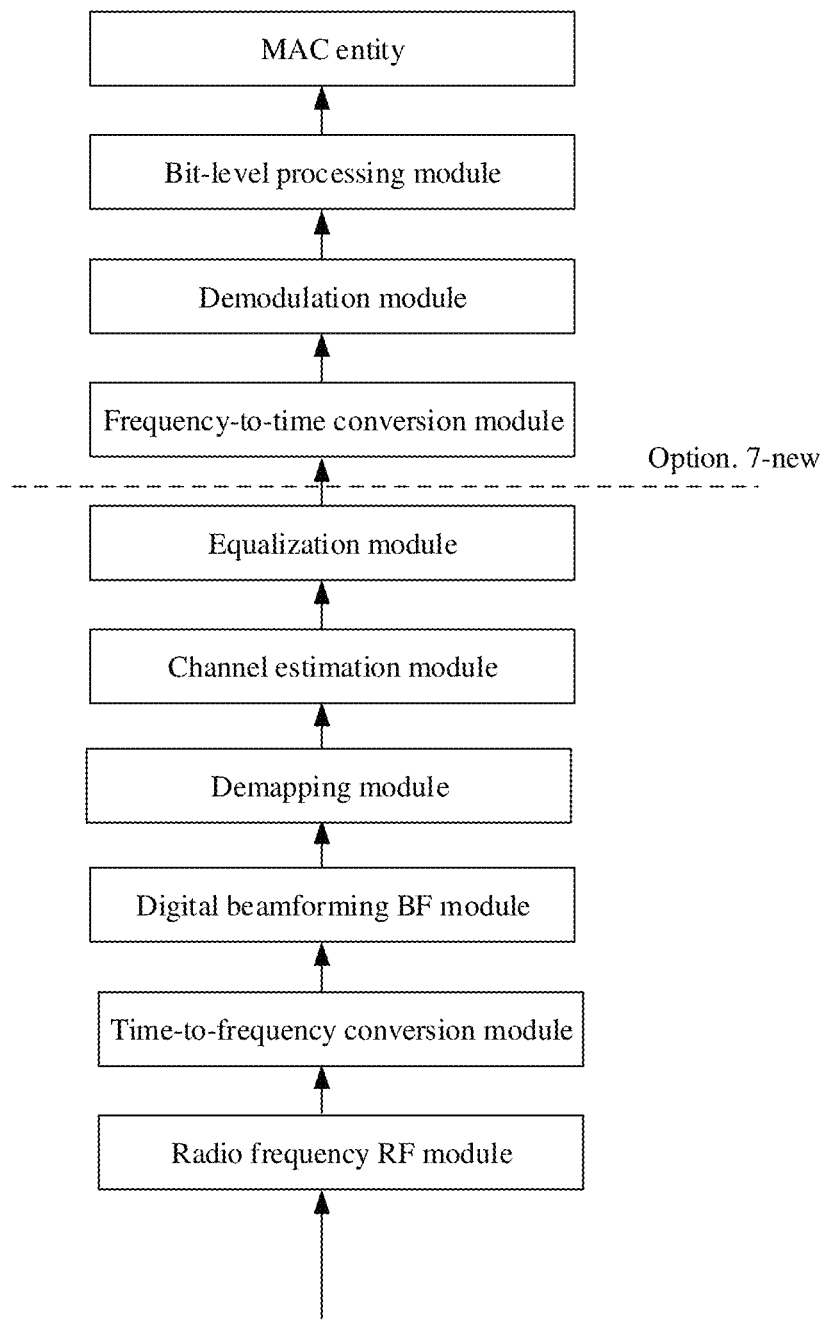
FIG. 3 is a schematic diagram of functional split on a first communications apparatus and a second communications apparatus according to another embodiment of this application.

Based on FIG. 2, when functions of the first communications apparatus 11 and the second communications apparatus 12 are redefined, the channel estimation module and the equalization module of the second communications apparatus 12 may be moved to the first communications apparatus 11, as shown in FIG. 3. The split manner may be denoted as an option. 7-new. For descriptions of units of the first communications apparatus 11 and units of the second communications apparatus 12 in option. 7-new, refer to related descriptions of option. 7-2a in FIG. 2.

Another split manner may be further included. For example, the channel estimation module, the equalization module, and the frequency-to-time conversion module are moved to the first communications apparatus 11; the channel estimation module, the equalization module, the frequency-to-time conversion module, and the demodulation module are moved to the first communications apparatus 11; the channel estimation module, the equalization module, the frequency-to-time conversion module, the demodulation module, and the bit-level processing module are moved to the first communications apparatus 11; or the time-to-frequency conversion module and the digital beamforming module of the first communications apparatus 11 are moved to the second communications apparatus 12. The foregoing are merely some listed examples. It may be understood that in some solutions, another function module may be further added between adjacent modules, or a part of function modules may be removed during actual use. For example, the digital beamforming BF module may be canceled in some solutions. This is not listed one by one in the embodiments this application.

In addition, in another solution, an uplink direction (namely, a transmission direction of data from the first communications apparatus 11 to the second communications apparatus 12) is used as an example. The first communications apparatus 11 and the second communications apparatus 12 sequentially perform, on a radio frequency signal received from the antenna system 13, processing of the following function modules: an analog-to-digital (analog to digital) conversion module, a time-to-frequency conversion module (which may include an FFT module and a CP removal module; for specific functions, refer to the foregoing descriptions, and details are not described again), a demapping (RE demapping) module, a channel estimation module or a filtering (prefiltering) module (in the uplink direction, one of the channel estimation module and the filtering module may be selected to perform channel estimation on the data), an equalization module, a frequency-to-time conversion module (which is usually an inverse discrete fourier transformation IDFT (inverse discrete fourier transform) module), a demodulation module, a descrambling module, a rate dematching module, a decoding module, and a MAC (media access control) entity. In an NR (new radio)/5G solution, a difference from an LTE solution is that processing of a frequency-to-time conversion module does not need to be performed on data in an uplink direction. The descrambling module is configured to perform descrambling processing on a signal output by the demodulation module, the rate dematching module is configured to perform rate dematching processing on a signal output by the descrambling module, and the decoding module is configured to perform decoding processing on a signal output by the rate dematching module. For functions of other modules, refer to the descriptions in the foregoing example. Details are not described herein again. Usually, if functions of the first communications apparatus 11 and the second communications apparatus 12 are split before the demapping (RE demapping) module, the split manner is usually denoted as an option. 7-1; if functions of the first communications apparatus 11 and the second communications apparatus 12 are split before the equalization module and the frequency-to-time conversion module, the split manner is usually denoted as an option. 7-2; if functions of the first communications apparatus 11 and the second communications apparatus 12 are split before the descrambling module, the split manner is usually denoted as an option. 7-3; if functions of the first communications apparatus 11 and the second communications apparatus 12 are split before the MAC entity, the split manner is usually denoted as an option. 7-6. The foregoing are merely some listed examples. It may be understood that in some solutions, another function module may be further added between adjacent modules, or a part of function modules may be removed during actual use. This is not listed one by one in the embodiments this application.

Usually, after determining a functional split manner of the first communications apparatus 11 and the second communications apparatus 12, for a signal obtained by the first communications apparatus 11, data transmission is performed in the specific fixed functional split manner. However, in different functional split manners, positions of a CPRI interface are different. Because bandwidth of the CPRI interface is usually fixed, when the CPRI interface is at different positions, the transmission bandwidth that can be provided by the CPRI interface causes a limitation on data transmission between the first communications apparatus 11 and the second communications apparatus 12. In addition, when there are excessive function modules in the first communications apparatus 11, processing complexity of the first communications apparatus 11 is greatly increased. For example, if the option. 7-2a split manner is used, traffic of data transmitted on the CPRI interface between the first communications apparatus 11 and the second communications apparatus 12 is related to a quantity of antennas. In a case of a massive MIMO (massive multiple-input multiple-output) system and high bandwidth, for example, 64TR (64 radio frequency antennas)×100 M bandwidth, the first communications apparatus 11 performs dimension reduction on a data stream of an antenna domain, to obtain a frequency domain data stream of a beam domain, and transmits the frequency domain data stream of the beam domain to the second communications apparatus 12. Traffic on the CPRI interface reaches 100 Gbps. Typical 25 G transmission bandwidth of the CPRI interface can only support transmission of 16 beams. Due to a limitation of the transmission bandwidth of the CPRI interface, a quantity of demodulation beams cannot be increased. In a case of uplink multi-layer or the like, performance deteriorates. However, if the option. 7-new split manner is used, or another split manner in which a functional split point is after the IDFT module is used, traffic of data transmitted on the CPRI interface between the first communications apparatus 11 and the second communications apparatus 12 is related to a quantity of demodulation layers paired with a RB (resource block) (that is, a quantity of user data streams carried on each RB). Generally, the quantity of demodulation layers is far less than a quantity of antennas or a quantity of beams. Therefore, the traffic of data transmitted between the first communications apparatus 11 and the second communications apparatus 12 may be greatly reduced, and demodulation using more antennas and beams is supported. However, a large quantity of algorithms of functions such as channel estimation and equalization are completed by the first communications apparatus 11, so that the processing complexity of the first communications apparatus 11 is greatly increased; and under constraints of power consumption and a volume of the first communications apparatus 11, the quantity of demodulation antennas and the quantity of demodulation beams cannot be effectively increased.

Therefore, this application provides a method in which the first communications apparatus and the second communications apparatus perform data transmission in a plurality of functional split manners, so that the limitation of the transmission bandwidth of the CPRI interface on the quantity of demodulation antennas and the quantity of demodulation beams can be reduced when the processing complexity of the first communications apparatus 11 is considered.

A basic principle of a data transmission control method according to the embodiments of this application is as follows. A first communications apparatus obtains radio frequency signals received through an antenna; the first communications apparatus processes at least two parts of signals in the radio frequency signals in at least two functional split manners, to generate at least two parts of transmission signals, where each part of signals in the radio frequency signals is processed in one functional split manner, and different parts of signals in the radio frequency signals are processed in different functional split manners; and the functional split manner is used to determine functional split on the first communications apparatus and the second communications apparatus when the part of signals in the radio frequency signals is processed; and the first communications apparatus sends the at least two parts of transmission signals to the second communications apparatus. For example, the at least two parts of signals in the radio frequency signals include a first part of signals and a second part of signals, where the first communications apparatus and the second communications apparatus process the first part of signals in a first functional split manner, and process the second part of signals in a second functional split manner. For example, the first functional split manner may be an option. 7-2a split manner, and the second functional split manner may be an option. 7-new split manner. For the first part of signals, the first communications apparatus may perform, on the first part of signals, processing of a radio frequency module, a time-to-frequency conversion module, and a digital beamforming module, and send the first part of signals to the second communications apparatus, and the second communications apparatus performs, on the first part of signals, processing of a demapping module and another function module after the demapping module. For the second part of signals, the first communications apparatus may perform, on the second part of signals, processing of a radio frequency module, a time-to-frequency conversion module, a digital beamforming module, a demapping module, a channel estimation module, and an equalization module, and send the second part of signals to the second communications apparatus, and the second communications apparatus performs processing of a frequency-to-time conversion module and another function module after the frequency-to-time conversion module. In this way, data transmission is implemented between the first communications apparatus and the second communications apparatus in a plurality of functional split manners. In this way, the first part of signals is processed in the option. 7-2a split manner and sent to the second communications apparatus, and the second part of signals is processed in the option. 7-new split manner and sent to the second communications apparatus, so that it can be avoided that when all the radio frequency signals are processed in the option. 7-2a split manner, interface bandwidth between the first communications apparatus and the second communications apparatus cannot meet a requirement. In addition, the first communications apparatus only processes the second part of signals in the option. 7-new split manner and sends the second part of signals to the second communications apparatus, so that a problem that complexity of the first communications apparatus is relatively high because all the radio frequency signals are processed by the first communications apparatus in the option. 7-new split manner is avoided.

Figure 4:
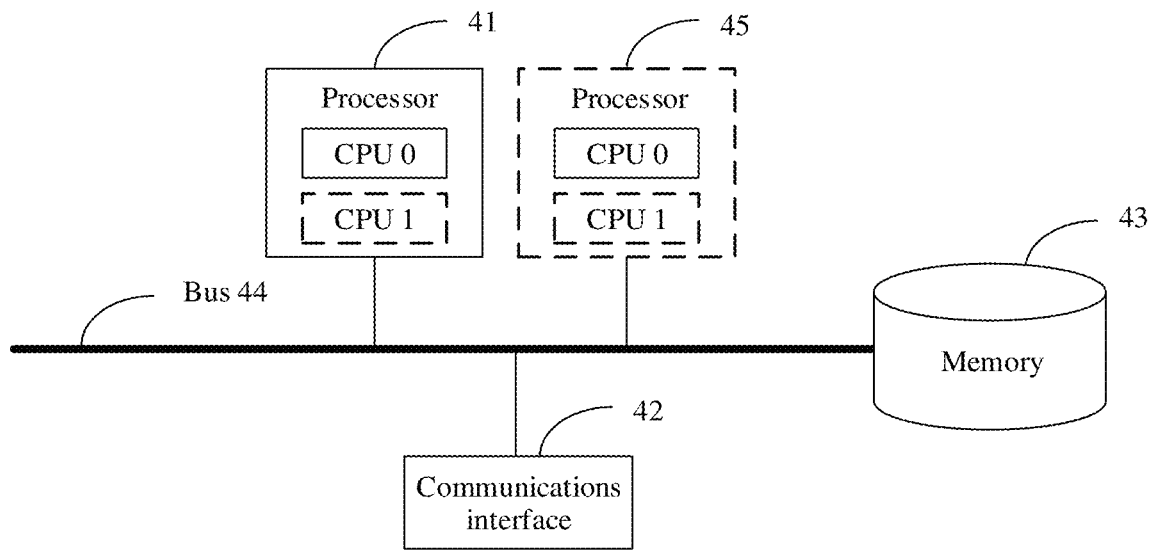
FIG. 4 is a schematic structural diagram of a first communications apparatus according to an embodiment of this application.

With reference to the base station shown in FIG. 1, an embodiment of this application provides a schematic composition diagram of a first communications apparatus. As shown in FIG. 4, the first communications apparatus may include at least one processor 41 and at least one communications interface 42. The at least one communications interface 42 is coupled to the one or more processors 41. The first communications apparatus communicates with another device through the at least one communications interface. The processor is configured to execute computer program code in a memory, so that the first communications apparatus performs the data transmission control method according to the embodiments of this application.

The following describes each component of the first communications apparatus in detail with reference to FIG. 4.

The processor 41 is a control center of the first communications apparatus, and may be one processor or may be a collective term of a plurality of processing elements. For example, the processor 41 is a CPU, may be an application-specific integrated circuit ASIC, or may be one or more integrated circuits configured to implement the embodiments of this application, for example, one or more microprocessors, one or more digital signal processor (DSP)s or one or more field programmable gate arrays FPGAs. Certainly, the first communications apparatus may further include a memory 43.

The processor 41 may independently perform functions of the first communications apparatus in this application, or may perform various functions of the first communications apparatus by running or executing a software program stored in the memory 43 and invoking data stored in the memory 43.

During specific implementation, in an embodiment, the processor 41 may include one or more CPUs, for example, a CPU 0 and a CPU 1 shown in the figure.

During specific implementation, in an embodiment, the first communications apparatus may include a plurality of processors, for example, the processor 41 and a processor 45 in FIG. 4. Each of the processors may be a single-core processor (single-CPU) or may be a multi-core processor (multi-CPU). The processor herein may refer to one or more devices, circuits, and/or processing cores configured to process data (for example, a computer program instruction).

The memory 43 may be a read-only memory ROM or another type of static storage device that can store static information and an instruction, a random access memory RAM or another type of dynamic storage device that can store information and an instruction, or may be an electrically erasable programmable read-only memory EEPROM, a compact disc read-only memory CD-ROM or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 43 is not limited thereto. The memory 43 may exist independently, and is connected to the processor 41 through a bus 44. The memory 43 may alternatively be integrated with the processor 41.

The memory 43 is configured to store a software program for performing the solutions of this application, and the processor 41 controls the execution.

The at least one communications interface 42 is configured to communicate with another device or a communications network. For example, the at least one communications interface 42 may include a first interface for communication with a second communications apparatus and a second interface for communication with an antenna system, where the first interface is configured to transmit at least two parts of transmission signals, and the second interface is configured to transmit a radio frequency signal of the antenna system.

The bus 44 may be an industry standard architecture ISA bus, a peripheral component interconnect PCI bus, an extended industry standard architecture EISA bus, or the like. The bus may be classified into an address bus, a data bus, a control bus, and the like. For ease of representation, only one thick line is used to represent the bus in FIG. 4, but this does not mean that there is only one bus or only one type of bus.

The device structure shown in FIG. 4 does not constitute any limitation on the first communications apparatus. The first communications apparatus may include more or fewer components than those shown in the figure, or combine some components, or have a different component arrangement.

Figure 5:
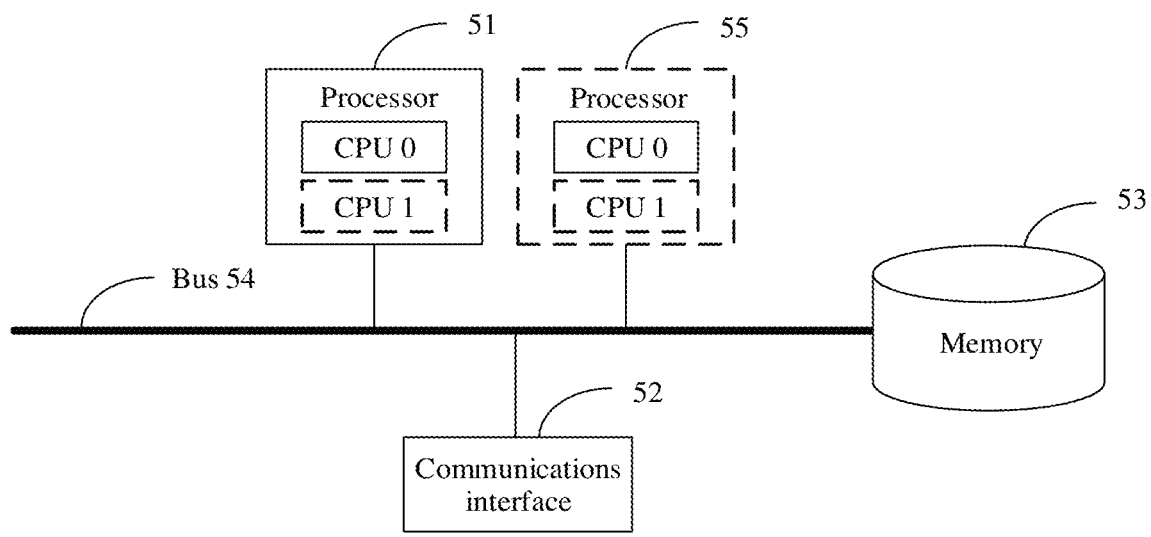
FIG. 5 is a schematic structural diagram of a second communications apparatus according to an embodiment of this application.

FIG. 5 shows a hardware structure of a second communications apparatus. As shown in FIG. 5, the second communications apparatus may include at least one processor 51 and at least one communications interface 52. The at least one communications interface 52 is coupled to the one or more processors 51. The second communications apparatus communicates with another device through the at least one communications interface 52. The processor 51 is configured to execute computer program code in a memory, so that the second communications apparatus performs the data transmission control method according to the embodiments of this application.

During specific implementation, in an embodiment, the processor 51 may include one or more CPUs, for example, a CPU 0 and a CPU 1 in FIG. 5.

During specific implementation, in an embodiment, the second communications apparatus may include a plurality of processors, for example, the processor 51 and a processor 55 in FIG. 5. Certainly, the second communications apparatus may further include a memory 53. In this way, the processor may perform various functions of the second communications apparatus by running or executing a software program stored in the memory 53 and invoking data stored in the memory 53. In addition, the second communications apparatus further includes a bus 54 connecting the processor 51, the at least one communications interface 52, and the memory 53.

For functions of the components shown in FIG. 5 and other descriptions, refer to the foregoing example descriptions.

In addition, the device structure shown in FIG. 5 does not constitute any limitation on the second communications apparatus. The second communications apparatus may include more or fewer components than those shown in the figure, or combine some components, or have a different component arrangement.

Figure 6:
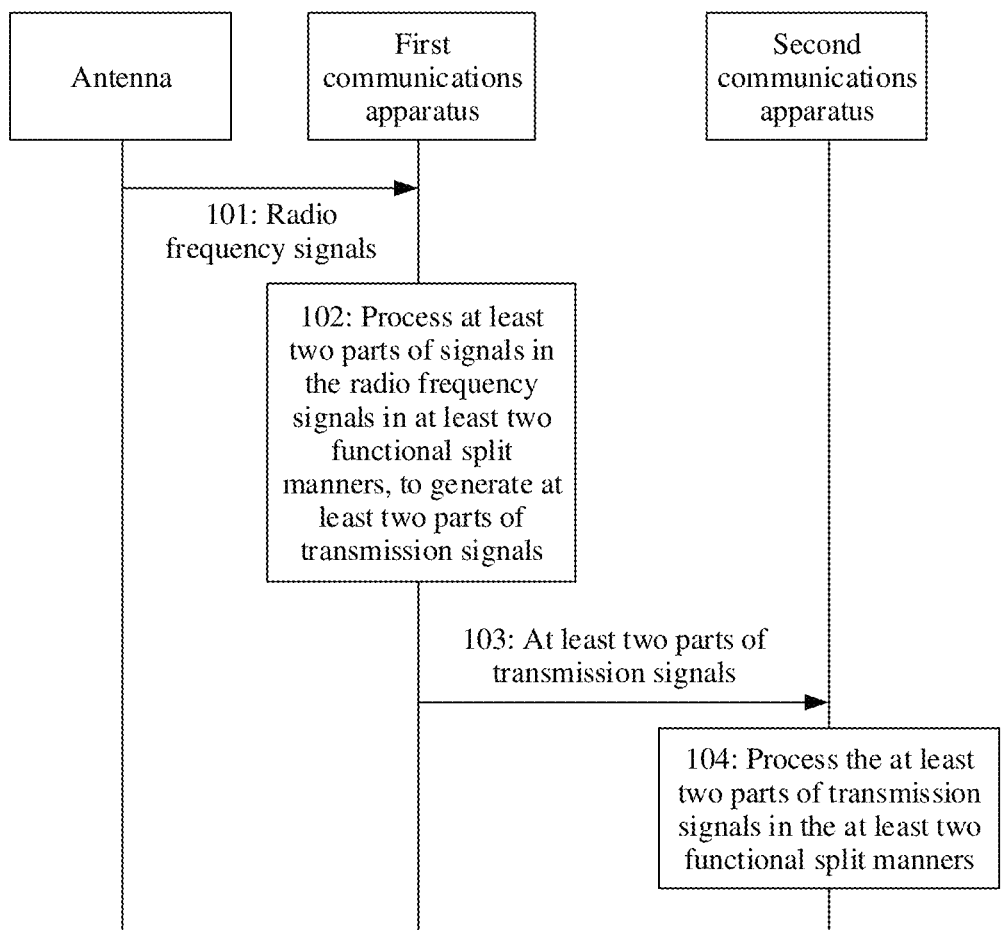
FIG. 6 is a schematic flowchart of a data transmission control method according to an embodiment of this application.

Based on the foregoing base station and hardware, an embodiment of this application provides a data transmission control method. Referring to FIG. 6, the method includes the following steps.

101: A first communications apparatus obtains radio frequency signals received through an antenna.

102: The first communications apparatus processes at least two parts of signals in the radio frequency signals in at least two functional split manners, to generate at least two parts of transmission signals.

Each part of signals in the radio frequency signals is processed in one functional split manner, and different parts of signals in the radio frequency signals are processed in different functional split manners; and the functional split manner is used to determine functional split on the first communications apparatus and a second communications apparatus when the part of signals in the radio frequency signals is processed.

The at least two functional split manners may include a first functional split manner and a second functional split manner.

The first functional split manner may be any one of an option. 7-1 split manner, an option. 7-2 split manner, an option. 7-3 split manner, an option. 7-6 split manner, an option. 7-2a split manner, and an option. 7-new split manner. The second functional split manner may be any one of the option. 7-1 split manner, the option. 7-2 split manner, the option. 7-3 split manner, the option. 7-6 split manner, the option. 7-2a split manner, and the option. 7-new split manner. Certainly, the first functional split manner and the second functional split manner need to be different functional split manners. In addition, another functional split manner derived in the art should also be included in the first functional split manner and the second functional split manner.

That the first communications apparatus processes the at least two parts of signals in the radio frequency signals in the at least two functional split manners, to generate the at least two parts of transmission signals may be understood as: The first communications apparatus processes one part of signals in the radio frequency signals in one functional split manner, to generate one part of transmission signals. That the first communications apparatus processes one part of signals in the radio frequency signals in one functional split manner, to generate one part of transmission signals may be understood as: The first communications apparatus processes the part of signals in the radio frequency signals based on a function, in the functional split manner, that needs to be completed by the first communications apparatus. For example, the first functional split manner is the option. 7-2a split manner, and for a part of signals in the radio frequency signals, the first communications apparatus needs to complete processing of an RF module, an FFT module, and a BF module, and then generates a part of transmission signals.

103: The first communications apparatus sends the at least two parts of transmission signals to the second communications apparatus.

Correspondingly, the second communications apparatus receives the at least two parts of transmission signals sent by the first communications apparatus.

104: The second communications apparatus separately processes the at least two parts of transmission signals in the at least two functional split manners.

Each part of transmission signals is processed in one functional split manner, and different parts of transmission signals are processed in different functional split manners; and the functional split manner is used to determine functional split on the first communications apparatus and the second communications apparatus when the transmission signals are processed.

That the second communications apparatus processes the at least two parts of transmission signals in the radio frequency signals in the at least two functional split manners may be understood as: The second communications apparatus processes one part of transmission signals in one functional split manner. That the second communications apparatus processes one part of transmission signals in the radio frequency signals in one functional split manner may be understood as: The second communications apparatus processes the part of transmission signals based on a function, in the functional split manner, that needs to be completed by the second communications apparatus. For example, the functional split manner is the option. 7-2a split manner, and for a part of transmission signals, the second communications apparatus needs to complete processing of a demapping module, a channel estimation module, an equalization module, a frequency-to-time conversion module, a demodulation module, a bit-level processing module, and a MAC module.

For example, the first functional split manner is the option. 7-2a split manner, the first communications apparatus directly performs, on a first part of signals in the radio frequency signals, processing of a radio frequency module, a time-to-frequency conversion module, and a digital beamforming module, and sends the first part of signals to the second communications apparatus, and the second communications apparatus performs, on the first part of signals, processing of a channel estimation module and another function module after the channel estimation module. For example, the second functional split manner is the option. 7-new split manner, the first communications apparatus still needs to sequentially perform, on a second part of signals in the radio frequency signals, processing of a radio frequency module, a time-to-frequency conversion module, a digital beamforming module, a demapping module, a channel estimation module, and an equalization module, and then send the second part of signals to the second communications apparatus, and the second communications apparatus performs processing of a frequency-to-time conversion module and another function module after the frequency-to-time conversion module. In this way, data transmission is implemented between the first communications apparatus and the second communications apparatus in a plurality of functional split manners.

The data transmission control method further includes: The first communications apparatus divides the radio frequency signals into the at least two parts of signals. It should be noted that the first communications apparatus may divide the radio frequency signals into the at least two parts of signals after the radio frequency signals are received; or the first communications apparatus performs first processing on the radio frequency signals, and then divides the radio frequency signals obtained after the first processing into the at least two parts of signals. The first processing includes at least analog-to-digital conversion processing; or the first processing may include analog-to-digital conversion processing; or the first processing may include analog-to-digital conversion processing and time-to-frequency conversion processing; or the first processing may include analog-to-digital conversion processing, time-to-frequency conversion processing, beamforming processing, and the like. Certainly, based on different functional split manners, the first processing may alternatively include more functions of an uplink direction (namely, a transmission direction of data from the first communications apparatus to the second communications apparatus). Optionally, the first processing may be processing shared by the at least two split manners. For example, the first functional split manner is the option. 7-2a split manner, the second functional split manner is the option. 7-new split manner, and the first processing may be a function of a radio frequency module, or the first processing may include functions of a radio frequency module and a time-to-frequency conversion module, or the first processing may include functions of a radio frequency module, a time-to-frequency conversion module, and a digital beamforming module.

Figure 7:
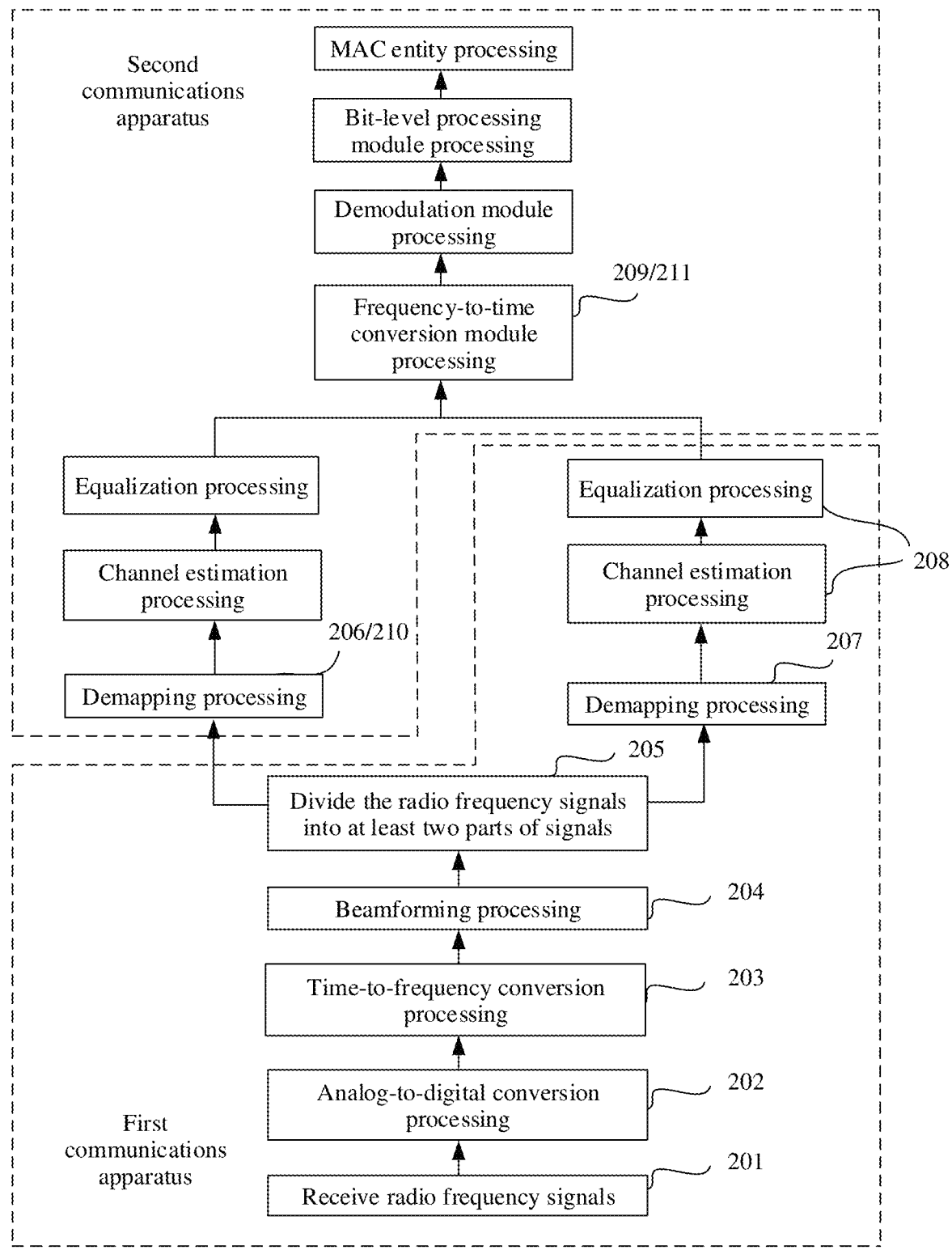
FIG. 7 is a schematic flowchart of a data transmission control method according to another embodiment of this application.

In the following example, an example in which the first functional split manner is an option. 7-2a split manner, the second functional split manner is an option. 7-new split manner, and the first processing includes functions of a radio frequency module, a time-to-frequency conversion module, and a digital beamforming module is used. Referring to FIG. 7, a data transmission control method is provided, and the method includes the following steps.

201: A first communications apparatus receives radio frequency signals sent by user equipment.

202: The first communications apparatus performs analog-to-digital conversion processing on the radio frequency signals, to generate time domain digital signals.

203: The first communications apparatus performs time-to-frequency conversion processing on the time domain digital signals, to generate frequency domain digital signals.

204: The first communications apparatus performs beamforming processing on the frequency domain digital signals, to generate digital signals of a beam domain.

205: The first communications apparatus divides the digital signals of the beam domain into at least two parts of signals, where the at least two parts of signals include a first part of signals and a second part of signals.

Certainly, in this solution, only an example in which the digital signals of the beam domain are divided into the at least two parts of signals in step 205 is used for description. In another solution, the radio frequency signals may alternatively be divided into two parts of signals after step 201, where analog-to-digital conversion processing, time-to-frequency conversion processing, and beamforming processing are sequentially performed on a first part of signals, to generate a first part of transmission signals; and analog-to-digital conversion processing, time-to-frequency conversion processing, beamforming processing, demapping processing, channel estimation processing, and equalization processing are sequentially performed on a second part of signals, to generate a second part of transmission signals. In addition, the radio frequency signals may alternatively be divided into two parts of signals after processing of any one of steps 202, 203, or 204.

206: The first communications apparatus sends the first part of signals to a second communications apparatus as a first part of transmission signals.

The first part of transmission signals is directly sent by the first communications apparatus to the second communications apparatus, and the second communications apparatus performs processing after the beamforming on the first part of transmission signals. That is, the first communications apparatus and the second communications apparatus process the first part of signals in the radio frequency signals in the option. 7-2a split manner. Because the first part of signals is processed only by a radio frequency RF module, a time-to-frequency conversion module, and a digital beamforming BF module on the first communications apparatus, processing on the first part of signals has a relatively low requirement on calculation complexity of the first communications apparatus.

207: The first communications apparatus performs demapping processing on the second part of signals.

208: The first communications apparatus sequentially performs channel estimation and equalization processing on the second part of signals obtained after the demapping processing, to generate a second part of transmission signals, where the second part of transmission signals are frequency domain user layer signals.

209: The first communications apparatus sends the second part of transmission signals to the second communications apparatus.

The analog-to-digital conversion processing, the time-to-frequency conversion processing, and the beamforming processing are sequentially performed by the first communications apparatus on the radio frequency signals, and the first communications apparatus divides the radio frequency signals into the first part of signals and the second part of signals. The demapping processing, the channel estimation processing, and the equalization processing are further performed on the second part of signals, and then the second part of transmission signals is generated and sent to the second communications apparatus. That is, the first communications apparatus and the second communications apparatus process the second part of signals in the option. 7-new split manner. In this case, traffic of data transmitted on an interface between the first communications apparatus and the second communications apparatus is related to a quantity of pairing layers (that is, a quantity of user data streams carried on each RB in a second signal), and generally, the quantity of pairing layers is far less than a quantity of antennas or a quantity of beams. Therefore, a data volume of the second part of transmission signals is less than a data volume of the second part of signals, and in this way, transmission traffic between the first communications apparatus and the second communications apparatus may be greatly reduced, and demodulation using more antennas or beams is supported.

210: The second communications apparatus receives the first part of transmission signals sent by the first communications apparatus, and performs, on the first part of transmission signals, processing corresponding to a demapping module and another function module after the demapping module.

For example, the second communications apparatus may sequentially perform, on the first part of transmission signals, processing corresponding to function modules such as a demapping module, a channel estimation module, an equalization module, a frequency-to-time conversion module, a demodulation module, a bit-level processing module, and a media access control MAC entity.

211: The second communications apparatus receives the second part of transmission signals sent by the first communications apparatus, and performs, on the second part of transmission signals, processing corresponding to a frequency-to-time conversion module and another function module after the frequency-to-time conversion module.

For example, the second communications apparatus may sequentially perform, on the second part of transmission signals, processing corresponding to function modules such as a frequency-to-time conversion module, a demodulation module, a bit-level processing module, and a media access control MAC entity.

In the foregoing solution, in a process of processing the radio frequency signals received by the first communications apparatus, through division of the radio frequency signals obtained after first processing into two parts of signals in step 205, a combination of the option. 7-2a split manner and the option. 7-new split manner of the first communications apparatus and the second communications apparatus is implemented in a data transmission control process, that is, a part of signals in the radio frequency signals is processed in the option. 7-2a split manner, and another part of signals in the radio frequency signals is processed in the option. 7-new split manner. In this way, compared with a case in which only the option. 7-2a split manner is used, in the technical solutions of this application, when transmission bandwidth between the first communications apparatus and the second communications apparatus is limited and processing complexity of the first communications apparatus is limited, the option. 7-2a split manner is used for a part of bandwidth, and the option. 7-new split manner is used for the other part of bandwidth, so that fronthaul traffic of a CPRI interface can be effectively balanced, and processing complexity can be shared by the first communications apparatus and the second communications apparatus. The foregoing uses only an example in which the option. 7-2a split manner and the option. 7-new split manner are combined for description. Certainly, this application is not limited to a combination of the option. 7-2a split manner and the option. 7-new split manner, and a combination of a plurality of split manners obtained by simply transforming the option. 7-2a split manner or the option. 7-new split manner is further included. For example, in step 205, the radio frequency signals obtained after the first processing may be alternatively divided into three parts, a first part of signals and a second part of signals are separately processed with reference to the manners provided in steps 201 to 210, and a third part of signals is processed in a split manner in which functional split is performed after a frequency-to-time conversion module, to be specific, after being processed by functions corresponding to a channel estimation module, an equalization module, and a frequency-to-time conversion module in the first communications apparatus, the third part of signals is sent to the second communications apparatus.

That the first communications apparatus divides the radio frequency signals into the at least two parts of signals, and separately processes the at least two parts of signals in different functional split manners in step 102 and step 205 in the foregoing embodiments may be specifically implemented with reference to the following manners.

Manner 1: The radio frequency signals may include signals of different users. The first communications apparatus may divide the signals of the different users into the at least two parts of signals, and the first communications apparatus and the second communications apparatus may process each part of signals in a different functional split manner. For example, the radio frequency signals may include signals of M+N users. The first communications apparatus may divide the signals of the M+N users into at least two parts of signals, for example, classify signals of M users as a first part of signals, and classify signals of N users as a second part of signals; and the first communications apparatus and the second communications apparatus may process the signals of the M users in a first functional split manner, and may process the signals of the N users in a second functional split manner. Certainly, if the first communications apparatus divides the radio frequency signals into two parts of signals after performing first processing on the radio frequency signals, the first communications apparatus specifically classifies signals of the M users in the radio frequency signals obtained after the first processing as a first part of signals, and classifies signals of the N users in the radio frequency signals obtained after the first processing as a second part of signals.

The first communications apparatus may store configuration information, to determine how to divide the radio frequency signals into the at least two parts of signals and a processing manner of each part of signals. In the configuration information, it may be configured that the first communications apparatus and the second communications apparatus process, in the option. 7-2a split manner, the signals that are of the M users and that correspond to identifiers of the M users, and process, in the option. 7-new split manner, the signals that are of the N users and that correspond to identifiers of the N users. For example, the configuration information may include a mapping relationship between the identifiers of the M users and the option. 7-2a split manner and a mapping relationship between the identifiers of the N users and the option. 7-new split manner. The configuration information may be configured in the first communications apparatus in a static manner, or may be sent by a radio resource management (RRM) entity of a base station to the first communications apparatus by using a layer-2 (L2, data link layer) message.

Manner 2: The radio frequency signals include a signal in first bandwidth of a first user and a signal in second bandwidth of the first user. The first communications apparatus processes the signal in the first bandwidth of the first user and the signal in the second bandwidth of the first user separately in different functional split manners. For example, the first communications apparatus classifies the signal, in the radio frequency signals, in the first bandwidth of the first user as a first part of signals; and the first communications apparatus classifies the signal, in the radio frequency signals, in the second bandwidth of the first user as a second part of signals. The first communications apparatus and the second communications apparatus may process, in a first functional split manner, the signal in the first bandwidth of the first user, and may process, in a second functional split manner, the signal in the second bandwidth of the first user. Certainly, if the first communications apparatus divides the radio frequency signals into two parts of signals after performing first processing on the radio frequency signals, the first communications apparatus specifically classifies a signal, in the radio frequency signals obtained after the first processing, in the first bandwidth of the first user as a first part of signals, and classifies a signal, in the radio frequency signals obtained after the first processing, in the second bandwidth of the first user as a second part of signals.

The first communications apparatus may store configuration information, to determine how to divide the radio frequency signals into the at least two parts of signals and a processing manner of each part of signals. In the configuration information, it may be configured that the first communications apparatus and the second communications apparatus process, in the option. 7-2a split manner, the signal in the first bandwidth corresponding to an identifier of the first user, and process, in the option. 7-new split manner, the signal in the second bandwidth corresponding to the identifier of the first user. For example, the configuration information may include a user identifier of a user A, bandwidth, of the user A, in which the option. 7-2a split manner is used, and bandwidth, of the user A, in which the option. 7-new split manner is used. The configuration information may be configured in the first communications apparatus in a static manner, or may be sent by a radio resource management entity of a base station to the first communications apparatus by using a layer-2 (L2, data link layer) message.

Manner 3: The radio frequency signals may be carried on different channels. For example, the radio frequency signals are carried on at least two channels (a first channel and a second channel). The first communications apparatus processes signals carried on the first channel and the second channel separately in different functional split manners. For example, the first communications apparatus classifies a radio frequency signal carried on the first channel as a first part of signals; and the first communications apparatus classifies a radio frequency signal carried on the second channel as a second part of signals. The first communications apparatus and the second communications apparatus may process, in a first functional split manner, the radio frequency signal carried on the first channel, and may process, in a second functional split manner, the radio frequency signal carried on the second channel. Certainly, if the first communications apparatus divides the radio frequency signals into two parts of signals after performing first processing on the radio frequency signals, the first communications apparatus specifically classifies a radio frequency signal that is obtained after the first processing and that is carried on the first channel as a first part of signals, and classifies a radio frequency signal that is obtained after the first processing and that is carried on the second channel as a second part of signals.

The first communications apparatus may store configuration information, to determine how to divide the radio frequency signals into the at least two parts of signals and a processing manner of each part of signals. In the configuration information, it may be configured that the first communications apparatus and the second communications apparatus process, in the option. 7-2a split manner, the radio frequency signal carried on the first channel, and process, in the option. 7-new split manner, the radio frequency signal carried on the second channel. For example, the configuration information may include a mapping relationship between an identifier of the first channel and the option. 7-2a split manner and a mapping relationship between an identifier of the second channel and the option. 7-new split manner. The configuration information may be configured in the first communications apparatus in a static manner, or may be sent by a radio resource management entity of a base station to the first communications apparatus by using a layer-2 (L2, data link layer) message.

Manner 4: The first communications apparatus may divide the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus. For example, the transmission bandwidth between the first communications apparatus and the second communications apparatus is 25 G (where the transmission bandwidth may be maximum bandwidth that can be supported by an interface or a communications cable between the first communications apparatus and the second communications apparatus), and needs to support uplink 4-layer 32-antenna receiving in 5G 100 M bandwidth. If the option. 7-2a split manner is used, traffic of data transmitted between the first communications apparatus and the second communications apparatus reaches 47 Gbps. If the option. 7-new split manner is used, traffic of data transmitted between the first communications apparatus and the second communications apparatus is only 5.45 Gbps; however, the first communications apparatus completes complex processing such as channel estimation and equalization, so that processing overheads are increased and power consumption of the first communications apparatus is increased. According to the technical solutions of this application, it is assumed that the option. 7-new split manner is used for 60% of the 47 Gbps data traffic, and the option. 7-2a split manner is used for 40% of the 47 Gbps data traffic. In this case, transmission traffic between the first communications apparatus and the second communications apparatus may be greatly reduced to 22.07 Gbps, which meets a constraint of the 25 G bandwidth. In addition, the first communications apparatus and the second communications apparatus each complete a part of channel estimation and equalization, so that processing complexity of the first communications apparatus is reduced, and the power consumption of the first communications apparatus is reduced. If the transmission bandwidth between the first communications apparatus and the second communications apparatus is limited to 20 G, a proportion of a data volume for which the option. 7-2a split manner is used is correspondingly adjusted to 35%, and a proportion of a data volume for which the option. 7-new split manner is used is correspondingly adjusted to 65%, to meet a bandwidth constraint.

Manner 5: The radio frequency signals are carried on at least two resource blocks RBs, and each resource block RB carries a predetermined quantity of user data streams. The first communications apparatus may process, based on the quantity of user data streams that are in the radio frequency signal and that are carried on each RB, radio frequency signals carried on RBs with different quantities of data streams separately in different functional split manners. For example, after obtaining a quantity of user data streams carried on each RB, the first communications apparatus classifies a radio frequency signal carried on at least one RB with a quantity of user data streams greater than or equal to a stream quantity threshold as a first part of signals; and the first communications apparatus classifies a radio frequency signal carried on at least one RB with a quantity of user data streams less than the stream quantity threshold as a second part of signals. The first communications apparatus and the second communications apparatus may process, in a first functional split manner, the radio frequency signal carried on the at least one RB with the quantity of user data streams greater than or equal to the stream quantity threshold, and may process, in a second functional split manner, the radio frequency signal carried on the at least one RB with the quantity of user data streams less than the stream quantity threshold. Certainly, if the first communications apparatus divides the radio frequency signals into two parts of signals after performing first processing on the radio frequency signals, the first communications apparatus specifically classifies a radio frequency signal that is obtained after the first processing and that is carried on the at least one RB with the quantity of user data streams greater than or equal to the stream quantity threshold as a first part of signals, and classifies a radio frequency signal that is obtained after the first processing and that is carried on the at least one RB with the quantity of user data streams less than the stream quantity threshold as a second part of signals.

The first communications apparatus may store configuration information, to determine how to divide the radio frequency signals into the at least two parts of signals and a processing manner of each part of signals. The configuration information may include the stream quantity threshold and the quantity of user data streams on each resource block. Because a larger quantity of pairing layers on an RB indicates a larger quantity of corresponding user data streams, and the larger quantity of corresponding user data streams leads to higher processing complexity, to reduce the processing complexity of the first communications apparatus, for an RB with a small quantity of pairing layers, for example, an RB with two pairing layers, the option. 7-new split manner is preferentially used; for an RB with a large quantity of pairing layers, for example, an RB with eight pairing layers, the option. 7-2a split manner is preferentially used.

Manner 6: The first communications apparatus divides the radio frequency signals obtained after predetermined processing into the at least two parts of signals based on any one or more of the following: an air interface feature of a user data stream carried on a resource block RB in a first signal, an evolved protocol version used for the user data stream, or a type of a receiver used for the user data stream.

The air interface feature includes an MCS (modulation and coding scheme), a speed status, and whether a user is a cell edge user. For example, in a JIRC CoMP (joint interference rejection combining coordinated multipoint transmission/reception) solution, a user needs to combine signals received in beam domains of a serving cell and a coordinated cell, and then send the combined signals to an equalization module for joint equalization. If the option. 7-new split manner is used, the first communications apparatus has separately balanced digital signals of the beam domains in the serving cell and the coordinated cell. Therefore, the option. 7-new split manner does not support JIRC CoMP. Therefore, for a cell edge user, a radio resource management entity of a base station may send configuration information to the first communications apparatus, to configure to classify a user data stream, of the cell edge user, in the radio frequency signals as a first part of signals. In addition, it is configured that a signal, in the first signal, of a user with a high MCS and a high speed is classified as a first part of signals, that is, the option. 7-2a split manner is used; it is configured that a signal, in the first signal, of a user with a low MCS and a low speed is classified as a second part of signals, that is, the option. 7-new split manner is used.

In addition, when a channel estimation module, an equalization module, and the like are configured in the first communications apparatus, a symbol-level processing procedure (for example, processing of the channel estimation module, the equalization module, and the demodulation module is symbol-level processing) and a bit-level processing procedure (processing of a module after the demodulation module is bit-level processing) are separated. Because an iterative receiver needs to perform information reconstruction on decoding soft information output by a bit-level processing module and feed back information after the information reconstruction to the channel estimation module for re-processing, the option. 7-new split manner is not conducive to supporting the iterative receiver that needs to support symbol-level and bit-level information exchange. Therefore, for a beneficiary user of the iterative receiver, the radio resource management entity of the base station may send configuration information to the first communications apparatus, to configure to classify a user data stream, of the beneficiary user of the iterative receiver, in the radio frequency signals as a first part of signals, that is, the option. 7-2a split manner is used.

In addition, for a user data stream for which an evolved protocol version NoMA (non-orthogonal multiple access) is used, performance by using an iterative receiver is better than performance by using a linear receiver, so that the option. 7-new split manner is not conducive to supporting the evolved protocol version NoMA. Therefore, for the user data stream for which the evolved protocol version NoMA is used, the radio resource management entity of the base station may send configuration information to the first communications apparatus, to configure the first communications apparatus to classify the user data stream as a first part of signals, that is, the option. 7-2a split manner is used. For a user data stream for which an evolved protocol version OFDM (orthogonal frequency division multiplexing) is used, the radio resource management entity of the base station may send configuration information to the first communications apparatus, to configure the first communications apparatus to classify the user data stream as a second part of signals, that is, the option. 7-new split manner is used.

Certainly, if the first communications apparatus divides the radio frequency signals into two parts of signals after performing first processing on the radio frequency signals, the first communications apparatus specifically divides the radio frequency signals obtained after the first processing into at least two parts of signals based on any one or more of the following: an air interface feature of a user data stream carried on a resource block RB in a first signal, an evolved protocol version used for the user data stream, or a type of a receiver used for the user data stream.

An embodiment of this application provides a first communications apparatus. The first communications apparatus is any one of the following: a radio remote unit RRU, a radio remote system RRS, a distributed unit DU, or a chip in any one of an RRU, an RRS, or a DU. The first communications apparatus is configured to perform the steps performed by the first communications apparatus in the foregoing data transmission control methods. The first communications apparatus provided in this embodiment of this application may include modules corresponding to the corresponding steps.

In the embodiments of this application, the first communications apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In the embodiments of this application, module division is an example, and is merely logical function division. During actual implementation, another division manner may be used.

Figure 8:
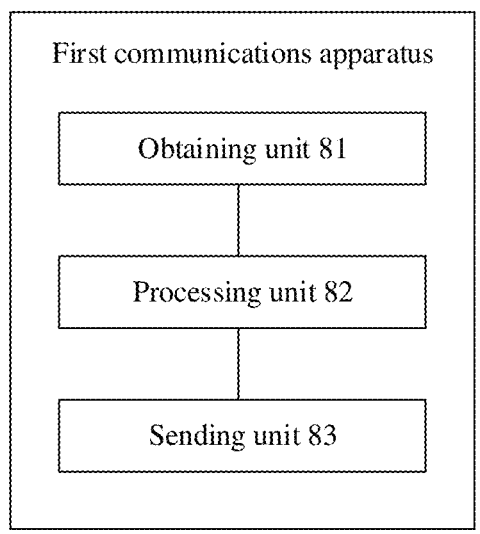
FIG. 8 is a schematic structural diagram of a first communications apparatus according to another embodiment of this application.

In a case in which each function module is obtained through division based on each corresponding function, referring to FIG. 8, a manner of performing function module division of a first communications apparatus is provided, and the first communications apparatus includes an obtaining unit 81, a processing unit 82, and a sending unit 83.

The obtaining unit 81 is configured to obtain radio frequency signals received through an antenna.

The processing unit 82 is configured to process, in at least two functional split manners, at least two parts of signals in the radio frequency signals obtained by the obtaining unit 81, to generate at least two parts of transmission signals, where each part of signals in the radio frequency signals is processed in one functional split manner, and different parts of signals in the radio frequency signals are processed in different functional split manners; and the functional split manner is used to determine functional split on the first communications apparatus and a second communications apparatus when the part of signals in the radio frequency signals is processed.

The sending unit 83 is configured to send, to the second communications apparatus, the at least two parts of transmission signals generated by the processing unit 82.

In an example solution, the processing unit 82 is further configured to divide the radio frequency signals obtained by the obtaining unit 81 into the at least two parts of signals. In addition, the processing unit 82 is further configured to perform first processing on the radio frequency signals obtained by the obtaining unit 81; and the processing unit 82 is specifically configured to divide the radio frequency signals obtained after the first processing into the at least two parts of signals, where the first processing includes at least analog-to-digital conversion processing.

In an example solution, the processing unit 82 is specifically configured to divide the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus.

In an example solution, the radio frequency signals are carried on at least two resource blocks RBs, and the processing unit 82 is specifically configured to: obtain a quantity of user data streams carried on each RB; classify a radio frequency signal carried on at least one RB with a quantity of user data streams greater than or equal to a stream quantity threshold as a first part of signals; and classify a radio frequency signal carried on at least one RB with a quantity of user data streams less than the stream quantity threshold as a second part of signals. The first part of signals is processed in a first functional split manner, and the first functional split manner includes an option. 7-2a split manner. The second part of signals is processed in a second functional split manner, and the second functional split manner includes an option. 7-new split manner.

In an example solution, the processing unit 82 is specifically configured to divide the radio frequency signals obtained after predetermined processing into the at least two parts of signals based on any one or more of the following: an air interface feature of a user data stream carried on a resource block RB in a first signal, an evolved protocol version used for the user data stream, or a type of a receiver used for the user data stream.

In an example solution, the radio frequency signals are carried on at least two channels, and the processing unit 82 is specifically configured to: classify a radio frequency signal carried on a first channel as a first part of signals; and classify a radio frequency signal carried on a second channel as a second part of signals.

In an example solution, the radio frequency signals include signals of M users and signals of N users, and the processing unit 82 is specifically configured to: classify the signals of the M users in the radio frequency signals as a first part of signals; and classify the signals of the N users in the radio frequency signals as a second part of signals.

In an example solution, the radio frequency signals include a signal in first bandwidth of a first user and a signal in second bandwidth of the first user, and the processing unit 82 is specifically configured to: classify the signal, in the radio frequency signals, in the first bandwidth of the first user as a first part of signals; and classify the signal, in the radio frequency signals, in the second bandwidth of the first user as a second part of signals.

In an example solution, the at least two functional split manners include an option. 7-2a split manner and an option. 7-new split manner.

Certainly, the first communications apparatus provided in this embodiment of this application includes but is not limited to the foregoing modules. For example, the first communications apparatus may further include a storage unit. The storage unit may be configured to store program code of the first communications apparatus. All related content of the steps in the foregoing method embodiments may be cited in function descriptions of corresponding function modules. Details are not described herein again.

When the first communications apparatus is the chip on the radio remote unit RRU, the radio remote system RRS, or the distributed unit DU, the obtaining unit 81 and the processing unit 82 may be the processor 41 in FIG. 4, and the sending unit 83 may be the at least one communications interface 42 in FIG. 4. When the first communications apparatus runs, the first communications apparatus performs the steps performed by the first communications apparatus in the data transmission methods in the foregoing embodiments.

Another embodiment of this application further provides a computer-readable storage medium. The computer-readable storage medium stores an instruction; and when the instruction is run on a first communications apparatus, the first communications apparatus performs the steps performed by the first communications apparatus in the data transmission methods in the foregoing embodiments.

Another embodiment of this application further provides a computer program product. The computer program product includes a computer-executable instruction, the computer-executable instruction is stored in a computer-readable storage medium, at least one processor of a first communications apparatus may read the computer-executable instruction from the computer-readable storage medium, and the at least one processor executes the computer-executable instruction, so that the first communications apparatus performs the steps performed by the first communications apparatus in the data transmission methods in the foregoing embodiments.

An embodiment of this application provides a second communications apparatus. The second communications apparatus is any one of the following: a baseband unit BBU, a radio cloud center RCC, a central unit CU, or a chip in any one of the BBU, the RCC, or the CU. The second communications apparatus is configured to perform the steps performed by the second communications apparatus in the foregoing data transmission control methods. The second communications apparatus provided in this embodiment of this application may include modules corresponding to the corresponding steps.

In the embodiments of this application, the second communications apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In the embodiments of this application, module division is an example, and is merely logical function division. During actual implementation, another division manner may be used.

Figure 9:
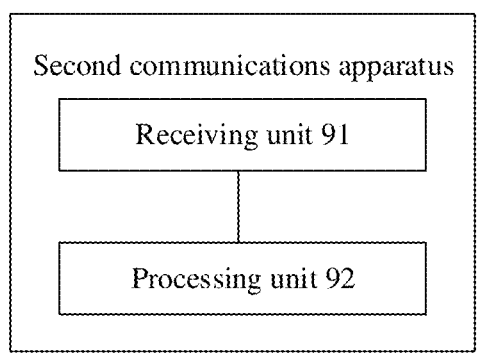
FIG. 9 is a schematic structural diagram of a second communications apparatus according to another embodiment of this application.

In a case in which each function module is obtained through division based on each corresponding function, referring to FIG. 9, a manner of performing function module division of a second communications apparatus is provided, and the second communications apparatus includes a receiving unit 91 and a processing unit 92.

The receiving unit 91 is configured to receive at least two parts of transmission signals sent by a first communications apparatus, where the at least two parts of transmission signals are generated after the first communications apparatus processes, in at least two functional split manners, at least two parts of signals in radio frequency signals received through an antenna; each part of signals in the radio frequency signals is processed in one functional split manner, and different parts of signals in the radio frequency signals are processed in different functional split manners; and the functional split manner is used to determine functional split on the first communications apparatus and the second communications apparatus when the part of signals in the radio frequency signals is processed.

The processing unit 92 is configured to separately process, in the at least two functional split manners, the at least two parts of transmission signals received by the receiving unit 91, where each part of transmission signals is processed in one functional split manner, and different parts of transmission signals are processed in different functional split manners; and the functional split manner is used to determine functional split on the first communications apparatus and the second communications apparatus when the transmission signals are processed.

In an example solution, the at least two functional split manners include an option. 7-2a split manner and an option. 7-new split manner.

Certainly, the second communications apparatus provided in this embodiment of this application includes but is not limited to the foregoing modules. For example, the second communications apparatus may further include a storage unit. The storage unit may be configured to store program code of the second communications apparatus. All related content of the steps in the foregoing method embodiments may be cited in function descriptions of corresponding function modules. Details are not described herein again.

When the second communications apparatus is the chip on the baseband unit BBU, the radio cloud center RCC, or the central unit CU, the processing unit 82 may be the processor 51 in FIG. 5, and the receiving unit 81 may be the at least one communications interface 52 in FIG. 5. When the second communications apparatus runs, the second communications apparatus performs the steps performed by the second communications apparatus in the data transmission methods in the foregoing embodiments.

Another embodiment of this application further provides a computer-readable storage medium. The computer-readable storage medium stores an instruction; and when the instruction is run on a second communications apparatus, the second communications apparatus performs the steps performed by the second communications apparatus in the data transmission methods in the foregoing embodiments.

Another embodiment of this application further provides a computer program product. The computer program product includes a computer-executable instruction, the computer-executable instruction is stored in a computer-readable storage medium, at least one processor of a second communications apparatus may read the computer-executable instruction from the computer-readable storage medium, and the at least one processor executes the computer-executable instruction, so that the second communications apparatus performs the steps performed by the second communications apparatus in the data transmission methods in the foregoing embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded or executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions about the implementations allow a person skilled in the art to clearly understand that, for the purpose of convenient and brief description, division of the foregoing function modules is taken as an example for illustration. During actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The storage medium includes any medium such as a USB flash drive, a removable hard disk, a read-only memory (ROM), a random access memory (RAM), a magnetic disk, or an optical disc, that can store program code.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications apparatus for a first communications apparatus, comprising a processor; and a memory coupled to the processor and storing executable non-transitory instructions that, when executed by the processor, cause the first communications apparatus to:
   receive radio frequency signals;
   process the radio frequency signals in at least two functional split manners, to generate at least two parts of transmission signals;
   send the at least two parts of transmission signals to a second communications apparatus; and
   divide the radio frequency signals into at least two parts of signals, wherein
   each of the at least two functional split manners is used to determine functional split on the first communications apparatus and the second communications apparatus when the radio frequency signals are processed;
   the radio frequency signals are carried on at least two resource blocks (RBs), the at least two parts of signals comprise a first part of signals and a second part of signals, and the processor that causes the first communications apparatus to divide the radio frequency signals into at least two parts of signals comprises:
   classifying a radio frequency signal carried on at least one RB with a quantity of user data streams greater than or equal to a stream quantity threshold as the first part of signals; and
   classifying a radio frequency signal carried on at least one RB with a quantity of user data streams less than the stream quantity threshold as the second part of signals.

2. The apparatus according to claim 1, wherein the non-transitory instructions, when executed by the processor, further cause the first communications apparatus to:
   receive configuration information from a radio resource management entity, wherein the configuration information is used to configure the first communications apparatus to process the radio frequency signals in the at least two functional split manners to generate the at least two parts of transmission signals.

3. The apparatus according to claim 2, wherein the configuration information is received via a layer-2 message.

4. The apparatus according to claim 1, wherein the non-transitory instructions, when executed by the processor, further cause the first communications apparatus to:
configure configuration information in a static manner, wherein the configuration information is used to configure the first communications apparatus to process the radio frequency signals in the at least two functional split manners to generate the at least two parts of transmission signals.

5. The apparatus according to claim 1, wherein
the radio frequency signals are processed through analog-to-digital conversion.

6. The apparatus according to claim 1, wherein
the at least two parts of signals are processed in the at least two functional split manners, to generate the at least two parts of transmission signals, and each part of the at least two parts of signals is processed in one of the at least two functional split manners, to generate one part of the at least two parts of transmission signals.

7. The apparatus according to claim 6, wherein the non-transitory instructions, when executed by the processor, cause the first communications apparatus to:
divide the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus.

8. The apparatus according to claim 7, wherein the first part of signals is processed in a first functional split manner, and the second part of signals is processed in a second functional split manner; and wherein the non-transitory instructions, when executed by the processor, cause the first communications apparatus to:
determine a data volume requirement for transmission between the first communications apparatus and the second communications apparatus when only the first functional split manner is used; and
determine a data volume requirement for the transmission between the first communications apparatus and the second communications apparatus when only the second functional split manner is used; and wherein
the dividing the radio frequency signals into the at least two parts of signals based on transmission bandwidth between the first communications apparatus and the second communications apparatus comprises:
determining a proportion of a data volume of the first part of signals to a data volume of the second part of signals based on the transmission bandwidth between the first communications apparatus and the second communications apparatus, the data volume requirement for the transmission between the first communications apparatus and the second communications apparatus when only the first functional split manner is used, and the data volume requirement for the transmission between the first communications apparatus and the second communications apparatus when only the second functional split manner is used; and
dividing the radio frequency signals into the first part of signals and the second part of signals based on the proportion.

9. The apparatus according to claim 6, wherein the processor that causes the first communications apparatus to divide the radio frequency signals into at least two parts of signals further comprises:
obtaining a quantity of user data streams carried on each RB.

10. The apparatus according to claim 6, wherein the dividing the radio frequency signals into at least two parts of signals comprises:
dividing the radio frequency signals obtained after predetermined processing into the at least two parts of signals based on any one or more of the following: an air interface feature of a user data stream carried on a resource block, RB in a first signal, an evolved protocol version used for the user data stream, or a type of a receiver used for the user data stream.

11. The apparatus according to claim 6, wherein the radio frequency signals are carried on a first channel and a second channel, the at least two parts of signals comprise a first part of signals and a second part of signals, and the dividing the radio frequency signals into at least two parts of signals comprises:
classifying a radio frequency signal carried on the first channel as the first part of signals; and
classifying a radio frequency signal carried on the second channel as the second part of signals.

12. The apparatus according to claim 6, wherein the radio frequency signals comprise signals of M users and signals of N users, the at least two parts of signals comprise a first part of signals and a second part of signals, and the dividing the radio frequency signals into at least two parts of signals comprises:
classifying the signals of the M users in the radio frequency signals as the first part of signals; and
classifying the signals of the N users in the radio frequency signals as the second part of signals.

13. The apparatus according to claim 6, wherein the radio frequency signals comprise a signal in first bandwidth of a first user and a signal in second bandwidth of the first user, the at least two parts of signals comprise a first part of signals and a second part of signals, and the dividing the radio frequency signals into at least two parts of signals comprises:
classifying the signal, in the radio frequency signals, in the first bandwidth of the first user as the first part of signals; and
classifying the signal, in the radio frequency signals, in the second bandwidth of the first user as the second part of signals.

14. A data transmission control method, comprising:
receiving, by a first communications apparatus, radio frequency signals;
processing, by the first communications apparatus, the radio frequency signals in at least two functional split manners, to generate at least two parts of transmission signals; and
sending, by the first communications apparatus, the at least two parts of transmission signals to a second communications apparatus,
wherein each of the at least two functional split manners is used to determine functional split on the first communications apparatus and the second communications apparatus when the radio frequency signals are processed, and the radio frequency signals are carried on at least two resource blocks (RBs), the at least two parts of signals comprise a first part of signals and a second part of signals, and the method further comprises:

classifying, by the first communications apparatus, a radio frequency signal carried on at least one RB with a quantity of user data streams greater than or equal to a stream quantity threshold as the first part of signals; and classifying, by the first communications apparatus, a radio frequency signal carried on at least one RB with a quantity of user data streams less than the stream quantity threshold as the second part of signals.

15. The method according to claim 14, wherein the method further comprises:

receiving, by the first communications apparatus, configuration information from a radio resource management entity, wherein the configuration information is used to configure the first communications apparatus to process the radio frequency signals in the at least two functional split manners to generate the at least two parts of transmission signals.

16. The method according to claim 15, wherein the method further comprises:

dividing, by the first communications apparatus, the radio frequency signals into the at least two parts of signals based on transmission bandwidth between the first communications apparatus and the second communications apparatus, so that a sum of data volumes of the at least two parts of transmission signals is less than or equal to the transmission bandwidth between the first communications apparatus and the second communications apparatus.

17. The method according to claim 15, wherein the first part of signals is processed in a first functional split manner, and the second part of signals is processed in a second functional split manner; and the method further comprises:

determining a data volume requirement for transmission between the first communications apparatus and the second communications apparatus when only the first functional split manner is used;

determining, by the first communications apparatus, a data volume requirement for the transmission between the first communications apparatus and the second communications apparatus when only the second functional split manner is used; and the dividing, by the first communications apparatus, the radio frequency signals into the at least two parts of signals based on transmission bandwidth between the first communications apparatus and the second communications apparatus comprises:

determining, by the first communications apparatus, a proportion of a data volume of the first part of signals to a data volume of the second part of signals based on the transmission bandwidth between the first communications apparatus and the second communications apparatus, the data volume requirement for the transmission between the first communications apparatus and the second communications apparatus when only the first functional split manner is used, and the data volume requirement for the transmission between the first communications apparatus and the second communications apparatus when only the second functional split manner is used; and dividing, by the first communications apparatus, the radio frequency signals into the first part of signals and the second part of signals based on the proportion.

18. The method according to claim 15, wherein the method further comprises:

dividing, by the first communications apparatus, the radio frequency signals obtained after predetermined processing into the at least two parts of signals based on any one or more of the following: an air interface feature of a user data stream carried on a resource block RB in a first signal, an evolved protocol version used for the user data stream, or a type of a receiver used for the user data stream.

19. The method according to claim 14, wherein the method further comprises:

obtaining, by the first communications apparatus, a quantity of user data streams carried on each RB.

* * * * *